United States Patent
Lynch

(10) Patent No.: US 11,824,341 B2
(45) Date of Patent: Nov. 21, 2023

(54) HIGH VOLTAGE CONDUCTOR COVER WITH FENDERS OVER RETAINING PIN HOLES

(71) Applicant: Eco Electrical Systems, Reno, NV (US)

(72) Inventor: Michael Lynch, Reno, NV (US)

(73) Assignee: Eco Electrical Systems, Inc., Reno, NV (US)

( * ) Notice: Subject to any disclaimer, the term of this patent is extended or adjusted under 35 U.S.C. 154(b) by 328 days.

(21) Appl. No.: 17/192,306

(22) Filed: Mar. 4, 2021

(65) Prior Publication Data

US 2021/0194232 A1    Jun. 24, 2021

Related U.S. Application Data

(63) Continuation-in-part of application No. 16/442,231, filed on Jun. 14, 2019, now Pat. No. 11,296,487.

(51) Int. Cl.
*H02G 7/05* (2006.01)

(52) U.S. Cl.
CPC ..................... *H02G 7/05* (2013.01)

(58) Field of Classification Search
CPC ........ H01B 19/00; H01B 17/00; H01B 17/56; H01B 17/005; H01B 17/26; H01B 7/00; H01B 17/583; H02G 7/00; H02G 1/02; H02G 7/05; H05K 5/03; H01R 4/70; A01M 29/00; A01M 29/32
USPC ......... 174/152 G, 153 G, 135, 152 R, 138 R, 174/139, 138 F, 137 R, 5 R, 140 H, 174/14 BH, 142, 5 SB, 40 R, 11 BH
See application file for complete search history.

(56) References Cited

U.S. PATENT DOCUMENTS

| | | | | |
|---|---|---|---|---|
| 4,845,307 A * | 7/1989 | Cumming | .............. | H01B 17/26 174/138 F |
| 7,154,036 B2 * | 12/2006 | Lynch | ...................... | H02G 7/00 174/138 F |
| 7,839,256 B2 * | 11/2010 | Bradford | ................ | H01B 17/00 337/186 |
| 8,618,412 B2 * | 12/2013 | Lynch | .................... | H01B 17/00 119/713 |
| 8,772,633 B2 * | 7/2014 | Behnken | ................ | H01B 19/00 174/138 R |
| 8,957,314 B2 * | 2/2015 | Niles | ....................... | H02G 7/00 174/172 |

(Continued)

*Primary Examiner* — Angel R Estrada
(74) *Attorney, Agent, or Firm* — Patent Law Group; Brian Ogonowsky

(57) ABSTRACT

A dielectric cover for an insulator, supporting a high voltage conductor in an electrical distribution system, has holes for receiving retaining pins. The retaining pins are used to secure the cover over the insulator and conductor. Arched fenders, which may be circular or have a bottom opening, extend out from the cover and overlie the holes and ends of the pins. The fenders prevent birds roosting on the pin, increase the dielectric surface length between the top of the cover and the electrical conductor above the pins, and protect the pins from contamination issues which would reduce the dielectric properties of the pins. Contamination issues include birds defecating on the pins, which can create a conductive path between the bird and the inside of the cover, and atmospheric moisture such as rain, snow, and ice on the pins. Thus, wildlife is protected from electrocution.

17 Claims, 9 Drawing Sheets

(56) References Cited

U.S. PATENT DOCUMENTS

| | | | |
|---|---|---|---|
| 10,881,097 B2* | 1/2021 | Lynch | H01B 17/56 |
| 10,958,046 B2* | 3/2021 | Lynch | H02B 1/06 |
| 11,296,487 B2* | 4/2022 | Lynch | H01H 31/006 |

* cited by examiner

HIGH VOLTAGE CONDUCTOR COVER WITH FENDERS OVER RETAINING PIN HOLES

CROSS-REFERENCE TO RELATED APPLICATIONS

This is a continuation-in-part of U.S. application Ser. No. 16/442,231, filed on Jun. 14, 2019, entitled Dielectric Cover for High Voltage Component With Hood Over Hole for Retaining Pin, by Michael Lynch, incorporated herein by reference.

FIELD OF THE INVENTION

This invention relates to a dielectric cover for high voltage power line insulators and conductors (wires) and, in particular, to an insulator cover system that has an extended fender over retaining pin holes.

BACKGROUND

A wood or metal utility pole is typically used for supporting high voltage (HV) conductors (e.g., twisted wire strands) in a power distribution system. Each pole has secured to it one or more crossarms that support insulators which, in turn, support the HV conductors. The insulators are typically ceramic or a polymer. A conductor is typically secured over the top of each insulator, or along its side, via a metal tie wire, a bracket, a clamp, or other means.

FIG. 1 is a perspective view of a top portion of a crossarm 10 of a utility pole. An insulator 12 is affixed to the crossarm 10 with a bolt 14. A generally horizontal conductor 16 seats in a top groove in the insulator 12 or along the neck area 18. There are many different designs of such insulators, and FIG. 1 shows a conventional design. A common feature of such insulators is a narrow neck area 18 and a wider skirt 20.

One known problem with exposed insulators and conductors is that large birds or other wildlife may alight on the grounded crossarm and short out phases or short a conductor to ground. Insulating (e.g., plastic) covers that cover the insulator 12 and a portion of the conductor 16 extending from the insulator 12 are known.

FIG. 2 is taken from the Applicant's U.S. application Ser. No. 16/779,169, incorporated herein by reference. FIG. 2 is a side view of a dielectric cover 24, such as a molded plastic, covering the insulator 12 of FIG. 1 and a portion of the conductor 16 for protecting wildlife and preventing outages from wildlife. The cover 24 comprises an insulator cover 26 and two identical attachable arms 28 and 30.

Holes 32 extend through the cover 24 and arms 28/30 and below the conductor 16. Retaining pins, described later, are inserted through the holes 32 and pass through corresponding holes on the opposite side under the conductor 16, which secures the cover 24 in place. The pins and the cover 24 may be manipulated by a hot stick while high voltage is conducted by the conductor 16 so there is no loss of power to the consumer when the cover 24 is installed.

The bottom of the insulator cover 26 rests on the wide skirt 20 of the insulator 12, or the top of the insulator abuts against the ceiling of the insulator cover 26, depending on the type of insulator used.

The pins and cover 26 have been used in the field, and a flashover problem has been discovered in rare instances. Such a flashover incurs a substantial expense since a lineman must replace a fuse. The flashover issue was presented by the utilities company to the Applicant for analysis. The Applicant has concluded that the flashover was due to conductive liquid entering the hole 32, then running along the retaining pin and creating a low resistance path between a high voltage component and ground (e.g., a roosting bird). The low resistance path (caused by the liquid) between the pin portion on the outside of the cover and the pin portion closest to the high voltage components caused an arc between the bird (roosting on the end of the pin) and the nearest grounded structure, such as a metal or wooded support structure. The liquid running along the pin in one case was due to a bird defecting on the pin while perhaps roosting on the pin. Bird droppings contain a relatively high concentration of salt, which causes the liquid to be conductive. Alternatively, rain or snow may be the cause of the liquid running along the pin.

What is needed is an improvement to the prior art cover that prevents flashovers due to conductive liquid entering the holes.

SUMMARY

Arched fenders are added over the insulator cover's holes (for retaining pins) to act as roofs or shields. The fenders may extend out from the cover by about one inch or more to shield the holes and pins. The pins have a ring (at least partially shielded by the fenders) at the end to allow the lineman to grasp the ring by a hot stick for insertion and removal of the pins.

The fenders have multiple purposes. The fenders effectively prevent birds roosting on the ring of the pins (whose bodies are directly below the HV conductor), increase the dielectric surface length between the top of the cover and the electrical conductor above the pins, and protect the pins from contamination issues which would reduce the dielectric properties of the pins. Contamination issues that are prevented, which potentially cause a flashover, include birds defecating on the pins (which can create a conductive path between the bird and the inside of the cover) and atmospheric moisture such as rain, snow, and ice on the pins.

Other features of the cover system are also described.

BRIEF DESCRIPTION OF THE DRAWINGS

Elements labeled with the same numerals in the various figures may be identical or similar.

DETAILED DESCRIPTION

Figure 1:
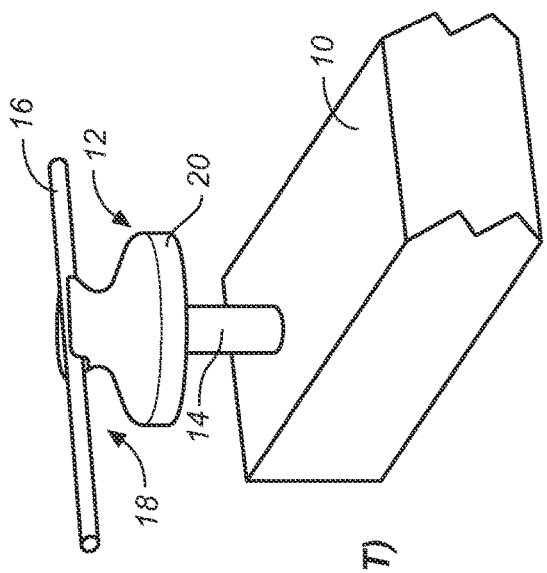
FIG. 1 is a perspective view of a crossarm of a utility pole supporting a conventional insulator and HV conductor.
Figure 2:
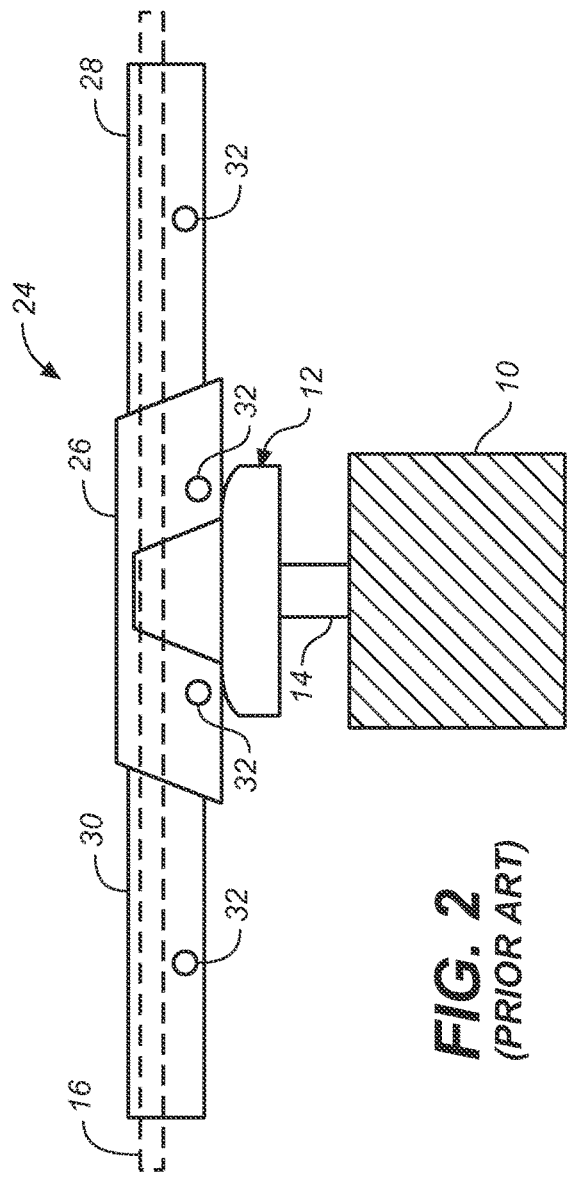
FIG. 2 is a side view of a conventional dielectric cover covering the insulator of FIG. 1 and a portion of the conductor for preventing outages from wildlife.
Figure 3:
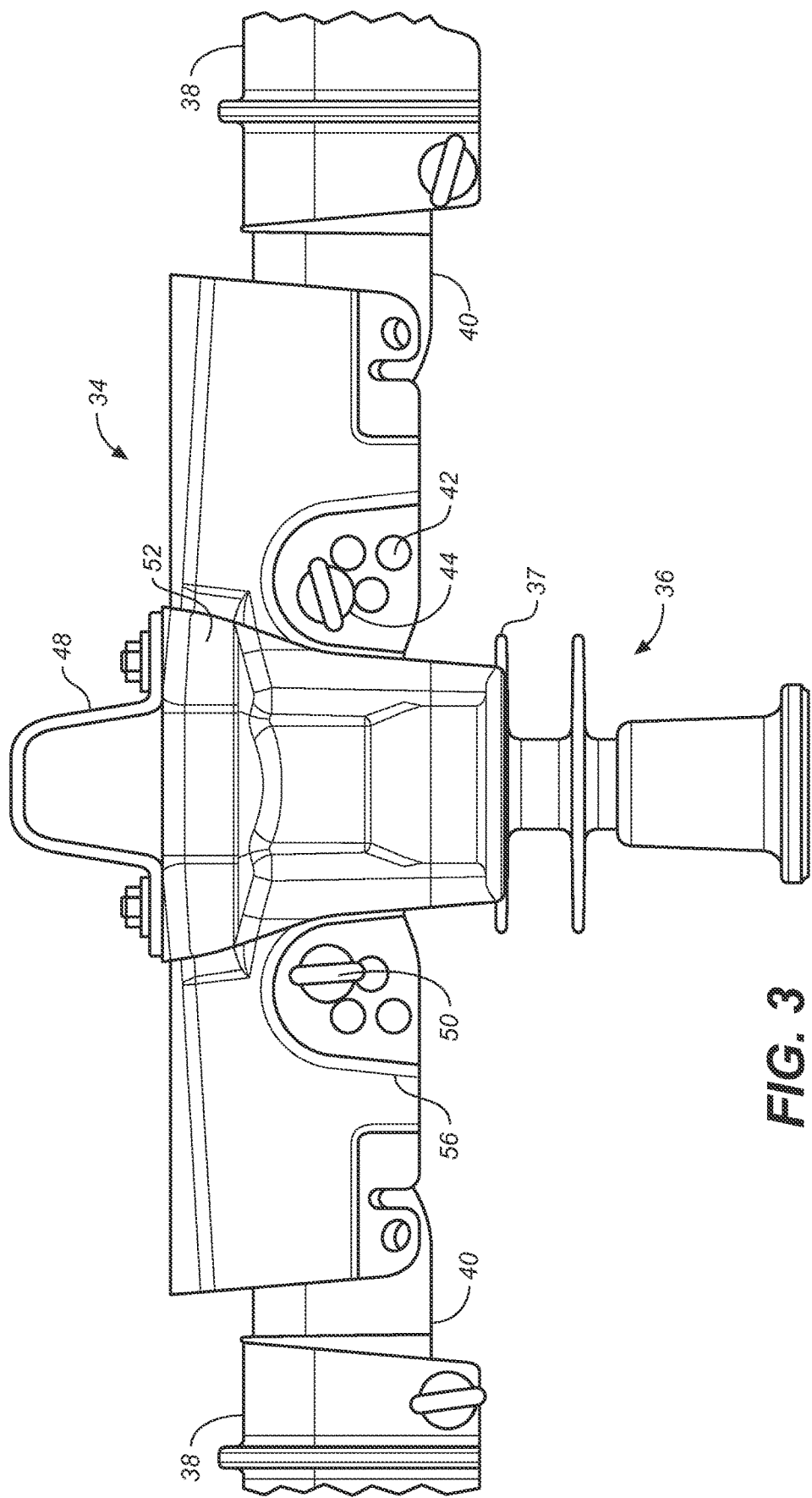
FIG. 3 is a side view of Applicant's new insulator cover, having arched fenders over the holes to shield the holes and ends of the pins from contamination. Also shown are optional attachable arms for the cover.

FIG. 3 is a side view of Applicant's dielectric cover 34, such as a molded plastic, covering an insulator 36. Any type of insulator may be covered. In one embodiment, the bottom of the cover 34 rests on the top rib 37 of the insulator 36 to prevent wildlife from getting under the cover 34. The insulator 36 may have a recessed top for supporting a HV wire and may also include a metal clamp for the wire. The cover 34 also covers a conductor (e.g., conductor 16 in FIG. 1) extending from the insulator 36 for protecting wildlife and preventing outages from wildlife. FIG. 3 also shows two identical attachable arms 38 and two arm adapters 40.

Figure 6:
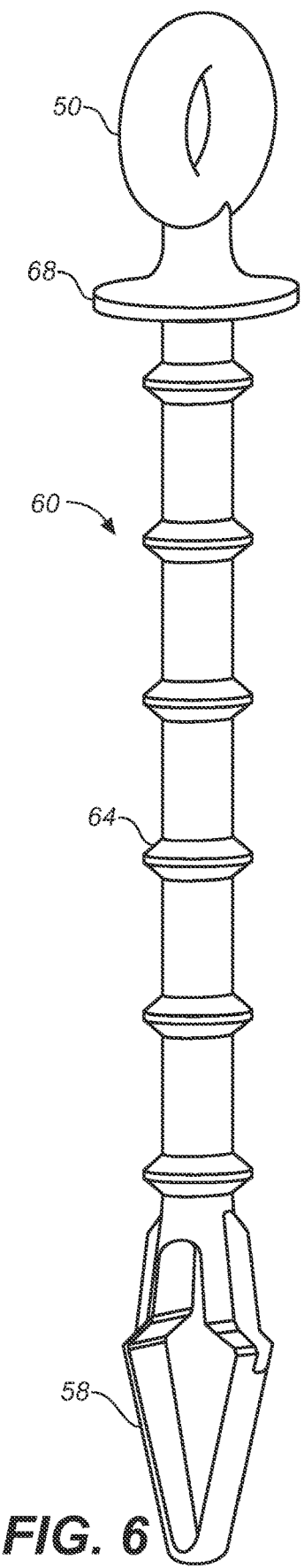
FIG. 6 is a perspective view of a dielectric retaining pin, where concentric skirts (tapering outward) are distributed along the body of the pin to increase the surface distance along the pins and to prevent liquid from running along the length of the pin.
Figure 7:
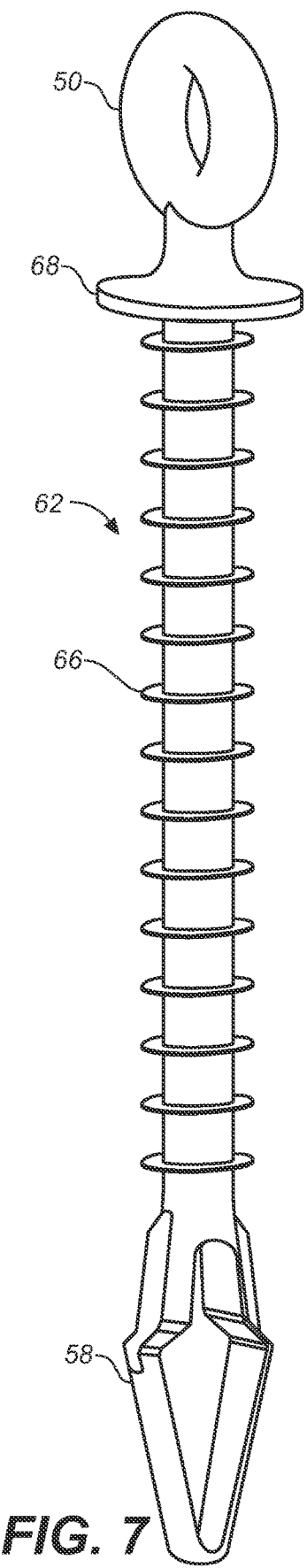
FIG. 7 is a perspective view of a dielectric retaining pin, where concentric ribs (generally constant thickness) are distributed along the body of the pin.

Holes 42 extend through the cover 34 and below the conductor. Identical retaining pins 44 are inserted through the holes 42 and pass through corresponding holes on the opposite side under the conductor, which secures the cover 34 and arms 38 in place. The pins 44 and the cover 34 may be manipulated by a hot stick while high voltage is conducted by the conductor so there is no loss of power to the consumer when the cover 34 is installed. The hot stick has a hook that engages holes in the cover 34, or the top handle 48, and a ring 50 in the pins 44. More detail of the pins 44 is shown in FIGS. 6 and 7.

An optional shell 52 is fitted over the cover 34 to effectively extend the vertical length of the cover 34 in the event that a K-Line™ type insulator is used that has a large metal top, where the shell 52 laterally shields the metal top. The shell 52 is not used with standard insulators.

Multiple holes 42 are shown, which enable the lineman to use the optimal holes for the particular insulator used. A minimum of vertical play is desired when securing the cover 34 over the insulator 36.

Ideally, the bottom of the cover 34 rests on the top rib 37 of the insulator 36.

Figure 4:
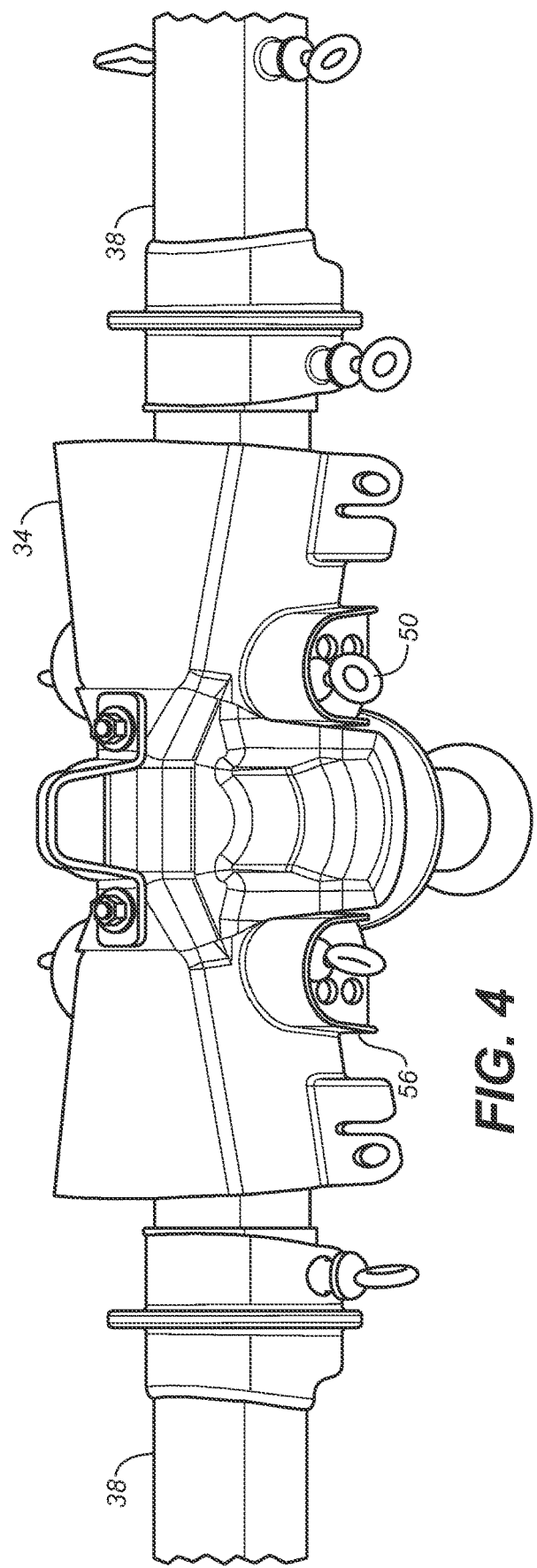
FIG. 4 is a top down perspective view of the Applicant's new cover of FIG. 3. An optional shell fits over the cover to effectively extend the depth of the cover by, for example, one or more inches to laterally cover a metal top of the insulator if a K-Line™ type insulator is used with a large metal top.
Figure 5:
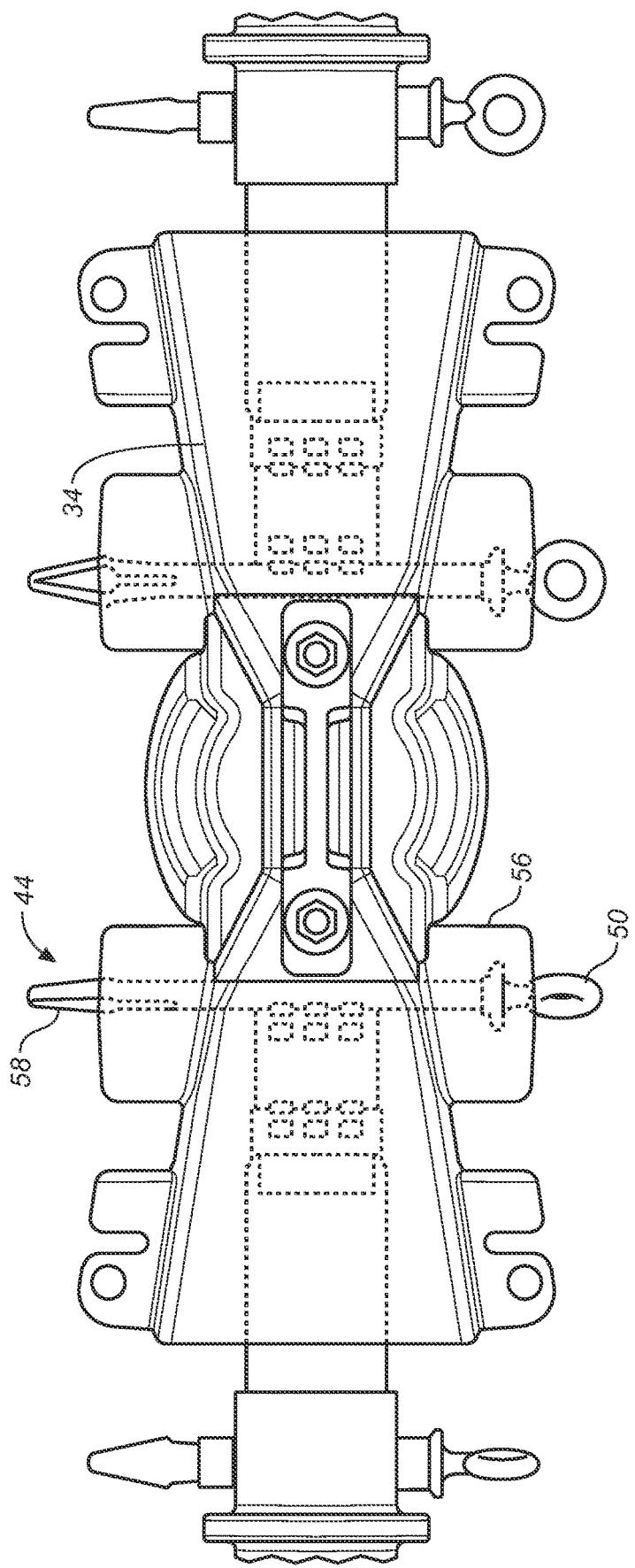
FIG. 5 is a top down semi-transparent view of the cover of FIGS. 3 and 4.

FIGS. 4 and 5 better show the pins 44 and arched fenders 56 over the pins 44 and holes 42. The fenders 56 act as roofs or shields. The fenders 56 extend out from the cover 34 by about one inch or more to shield the holes 42 and to fully or partially shield the rings 50 of the pins 44 while allowing the lineman to grasp the rings 50 of the pins 44 by a hot stick. The fenders 56 can extend out any suitable length to shield the end of the pins and the holes 42. The fenders 56 are shown semi-hemispherical to make it difficult for birds to roost on the fenders 56. The fenders 56 extend down to the bottom of the cover 34 to laterally shield the pin 44 and holes 42.

In the example of FIG. 5, the fenders 56 do not fully cover the rings 50 to allow a lineman to easily grasp the rings 50 with a hot stick. FIG. 5 illustrates the fenders 56 partially covering the rings 50 when looking directly down on the cover 34. Birds do not roost on the rings 50 because the fenders 56 interfere with the roosting. Even if a bird roosted on the rings 50, the bird's defecation would not enter the holes 42 or run along the body of the pins 44 due to the fenders 56.

The fenders 56 have multiple purposes. The fenders 56 effectively prevent birds roosting on the pin 44 (whose bodies are directly below the HV conductor), increase the dielectric surface length between the top of the cover 34 and the electrical conductor above the pins 44, and protect the pins 44 from contamination issues which would reduce the dielectric properties of the pins 44. Contamination issues include birds defecating on the pins 44, which can create a conductive path between the bird and the inside of the cover 34, and atmospheric moisture such as rain, snow, and ice on the pins 44.

Other shapes and sizes of fenders can also be used. Other names for the fenders 56 include hoods, shields, and roofs.

The pins 44 have a resilient end 58 that allows insertion of the pins 44 with a relatively light pushing force and removal of the pins 44 with a stronger pulling force.

There are a variety of insulator shapes, and the insulator 36 is just an example. The insulator cover 34, arms 38, and optional shell 52 may be molded to accommodate any standard insulator shape and any K-Line™ type insulator shape while still retaining all aspects of the invention.

In one example, the cover 34 may have a vertical depth of 4-5 inches (which accommodates the thickness of the wire).

FIGS. 6 and 7 illustrate dielectric retaining pins 60 and 62 that may be used to secure dielectric covers over high voltage components. The covers may be the insulator cover 34, cutout covers (such as described in Applicant's U.S. application Ser. No. 16/442,231), or any other type of insulating cover, typically for protecting wildlife from electrocution.

In one embodiment, the pins 60 and 62 are about 4 inches long, and the drawings have generally accurate relative dimensions. The pins 60 and 62 are an injection molded polymer.

The pin 60 of FIG. 6 has skirts 64, and the pin 62 of FIG. 7 has ribs 66 along the body of the pins. The pin 60 or 62 is inserted through the cover's holes 42 (FIG. 3) until the expanded portion 68 of the pin 60/62 abuts the cover 34. The expanded portion 68 provides one level of prevention of liquids entering the cover 34 via the pin 60/62 and holes 42.

In the event a liquid enters the cover 34 via the pin 60/62 (such as during a storm), the skirts 64 or ribs 66 not only block the liquid from running along the body of the pin but add a significant surface leakage distance along the pin's body. This greatly increases the flashover voltage and the insulating properties of the cover assembly in high moisture conditions.

Figure 8:
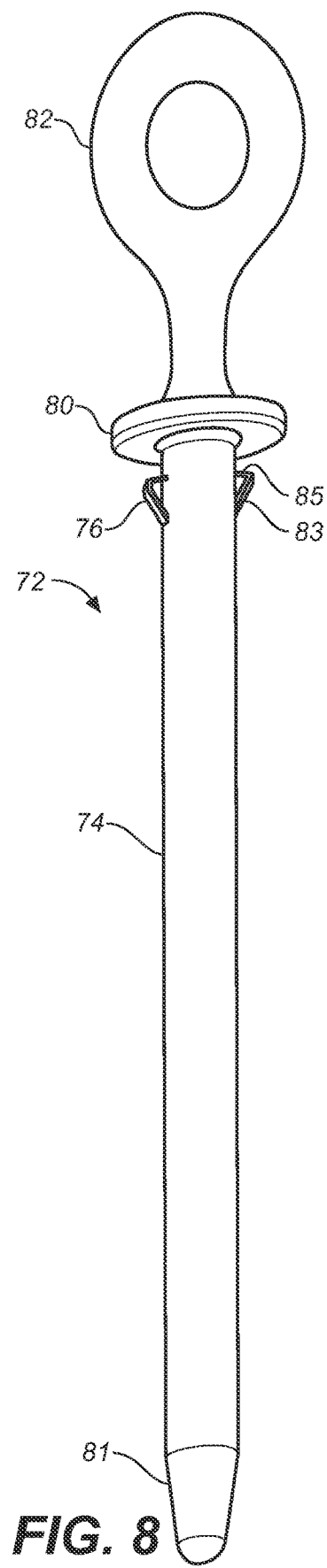
FIG. 8 is a perspective view of a dielectric retaining pin having a smooth body and a resilient portion near its flange, where the body is shorter than the pins of FIGS. 6 and 7 (for the same cover) so that the end of the pin does not extend beyond the fender.

FIG. 8 is a perspective view of a dielectric retaining pin 72 having a smooth body 74 and a resilient portion 76 near its flange 80, where the body 74 is shorter than the pins of FIGS. 6 and 7 (for the same cover) so that the end 81 of the pin 72 does not extend beyond the cover's fender. The grasping ring 82 is further from the flange 80 compared to the pins of FIGS. 6 and 7 to cause the ring 82 to extend out beyond the cover's fender when the flange 80 abuts the cover's outer surface. The resilient portion 76 easily bends when pushing the pin 72 in and locks the pin 72 in place so the flange 80 abuts the cover. The pin 72 is more difficult to remove.

The pin 72 is a single molded polymer piece. The relative dimensions are substantially accurate in FIG. 8. For a seven inch pin 72, the body 74 (between the end 81 and the flange 80) is approximately five inches long, the width of the body 74 is approximately one-quarter inch, the distance between the flange 80 and the far end of the ring 82 is approximately two inches, and the resilient portion 76 is approximately one-quarter inch long. The width of the resilient portion 76 is approximately one-eighth inch so easily bends when inserting the pin 72 into the cover hole. The body 74 of the pin 72 is smaller than the cover hole, and the resilient portion 76, when not compressed, is slightly larger than the cover hole.

The resilient portion 76 has an angled part 83 (that is easily compressed) and a flat part 85. When the pin 72 is fully inserted into the cover hole, the resilient portion 76 snaps back, the pin 72 is locked into place, and the flange 80 abuts the outer surface of the cover. There are identical resilient portions 76 on opposite sides of the pin 72. Pulling on the pin 72 causes the flat part 85 of the resilient portion 76 to bend so the pin 72 can be removed. In the example, the resilient portion 76 is spaced approximately one-eighth inch from the flange 80. The distance would be greater for a thicker cover material.

The pin 72 may be used with the cover 34 or the fuse cutout covers described below.

In another embodiment, which is not optimal, the pin 72 is shorter and only extends through one hole in the cover. That is sufficient to retain the cover in place when the resilient portion 76 secures the pin 72 in place.

Figure 9:
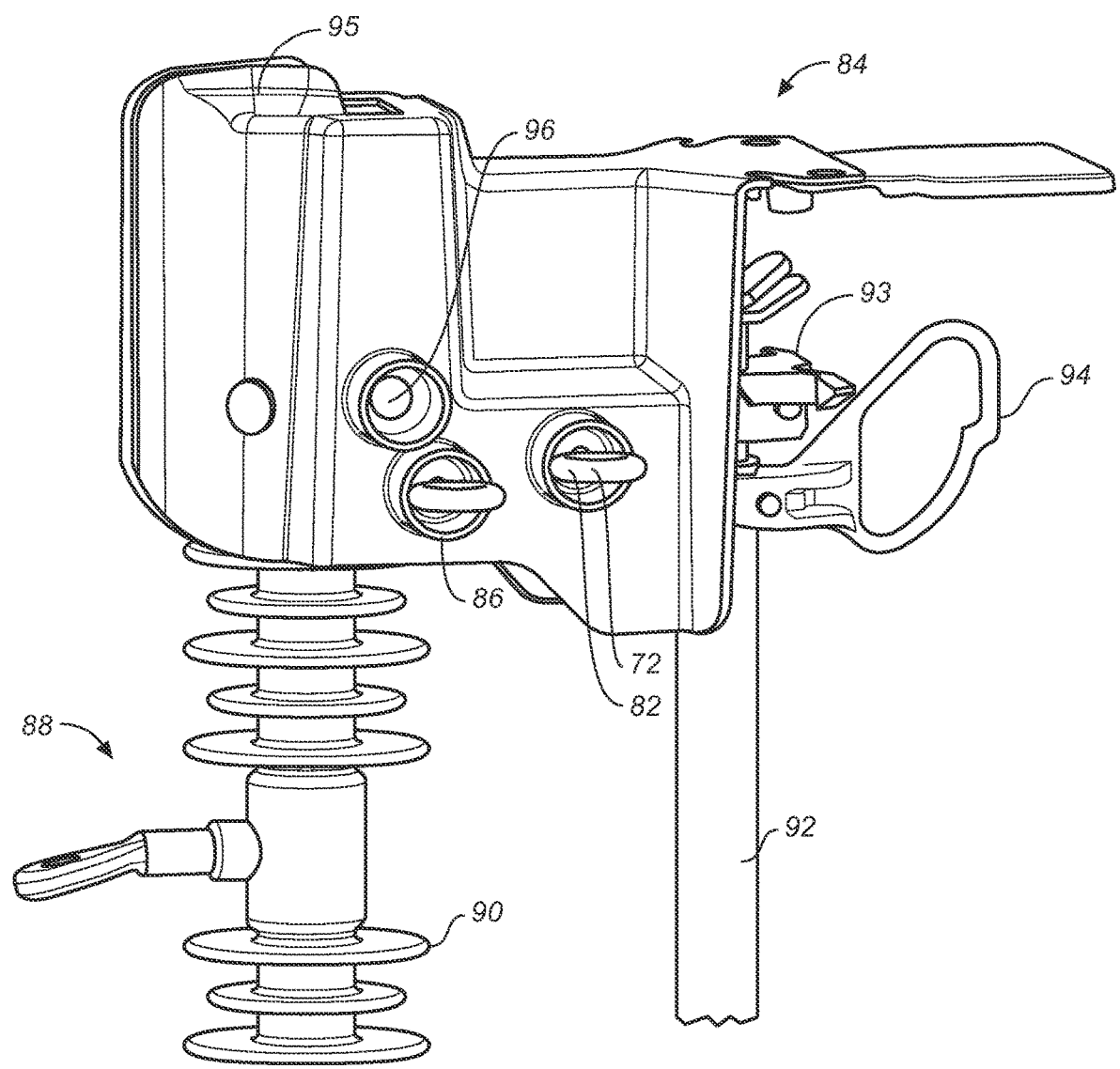
FIG. 9 is a perspective view of a fuse cutout cover where the fenders are circular and surround the two ends of the pin 360 degrees for additional protection of the pins from contaminating liquids. The pin from FIG. 8 is used in FIGS. 9-12.

FIG. 9 is a perspective view of a fuse cutout cover 84 where the fenders 86 are circular and surround the two ends of the pin 72 360 degrees for additional protection of the pins 72 from contaminating liquids. In such a case, the arched roof fenders 56 of FIGS. 3-5 are modified to fully surround the bottoms of the retaining pin holes. The fuse cutout 88 is conventional and comprises an insulator 90, a blowable fuse 92, a mechanism (at the bottom of the fuse 92) that causes the fuse to pivot outward and downward when blown to create a wide clearance between the top of the fuse 92 and a high voltage top connector 93, and a ring 94 that can be pulled by a hot stick to pull the fuse 92 outward to open the circuit. A high voltage wire (not shown) extends from the top of the cutout 88 and through a top opening 95 of the cover 84. The cover 84 has a rear slot for the wire so it can be installed when the wire is energized.

In one embodiment, the fenders 86 can be attachable to an existing cover so a new mold for the cover does not have to be made. The attachment may be done adhesively, or by heat fusing, or by using bolts or tabs, etc.

FIG. 9 shows the rings 82 of the pins 72 extending beyond the fenders 86. The pins 72 are inserted through two of the three cover holes 96 for retaining the cover 84 over the cutout 88. Some types of cutouts block one of the holes, so the other two holes are used for the pins 72. The pins 72 go under the top connector 93 of the cutout 88 to prevent the cover 84 being lifted off the cutout 88 in high winds.

Figure 10:
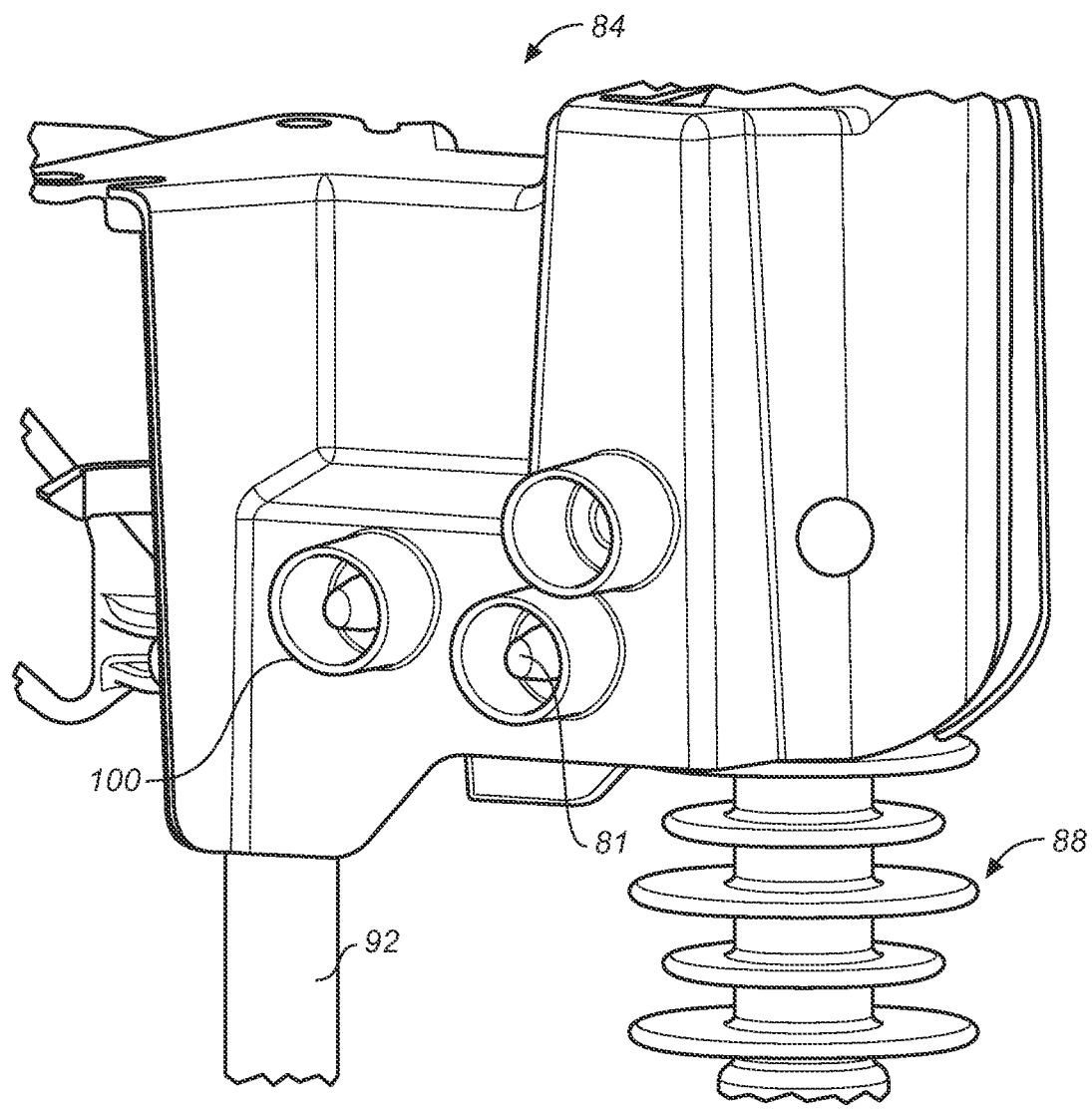
FIG. 10 is a perspective view of the opposite side of the cover of FIG. 9.

FIG. 10 is a perspective view of the opposite side of the cover 84 of FIG. 9. Note how the ends 81 of the pins 72 are surrounded by the fenders 100.

Figure 11:
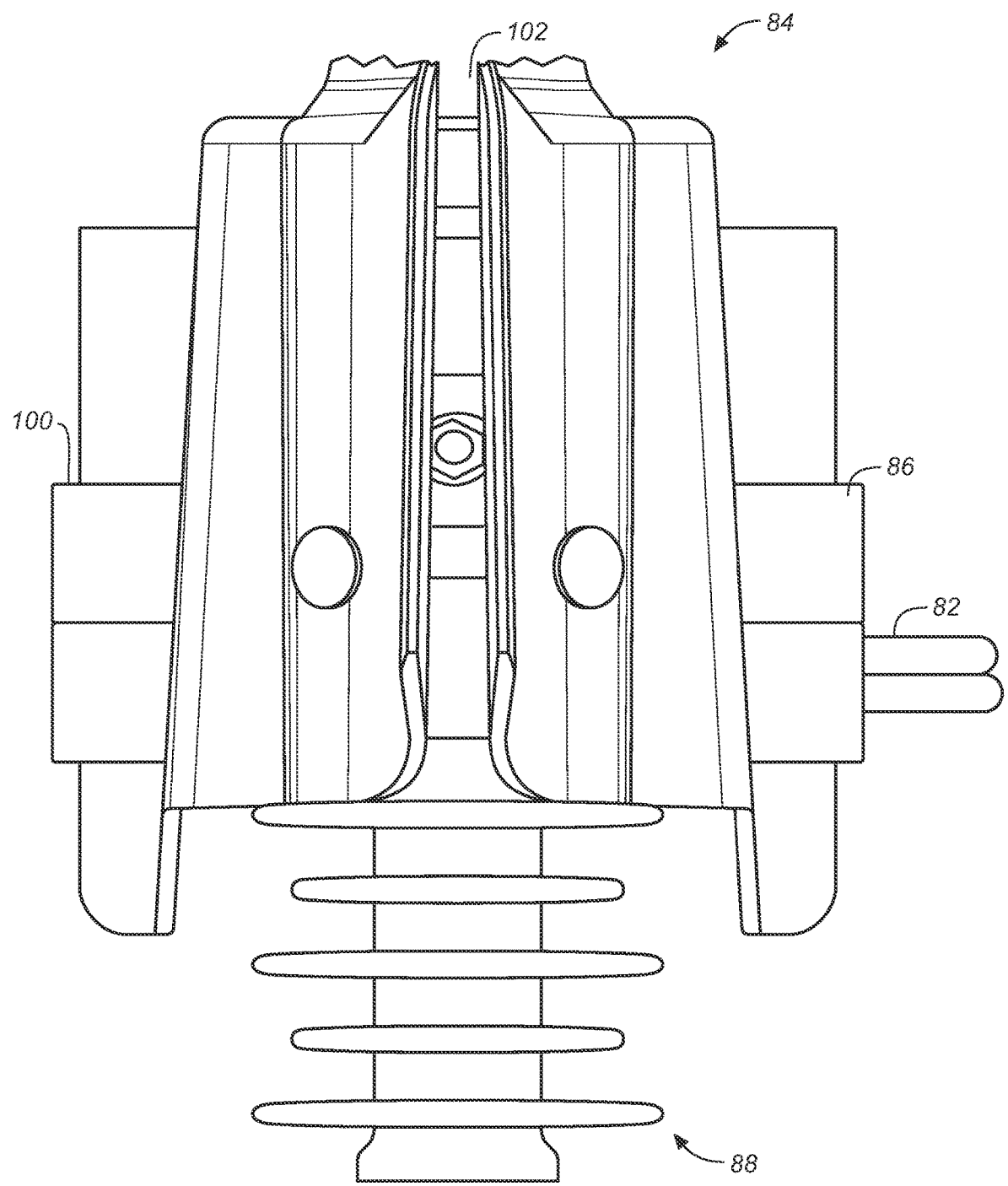
FIG. 11 is a back view of the cover of FIGS. 9 and 10.
Figure 12:
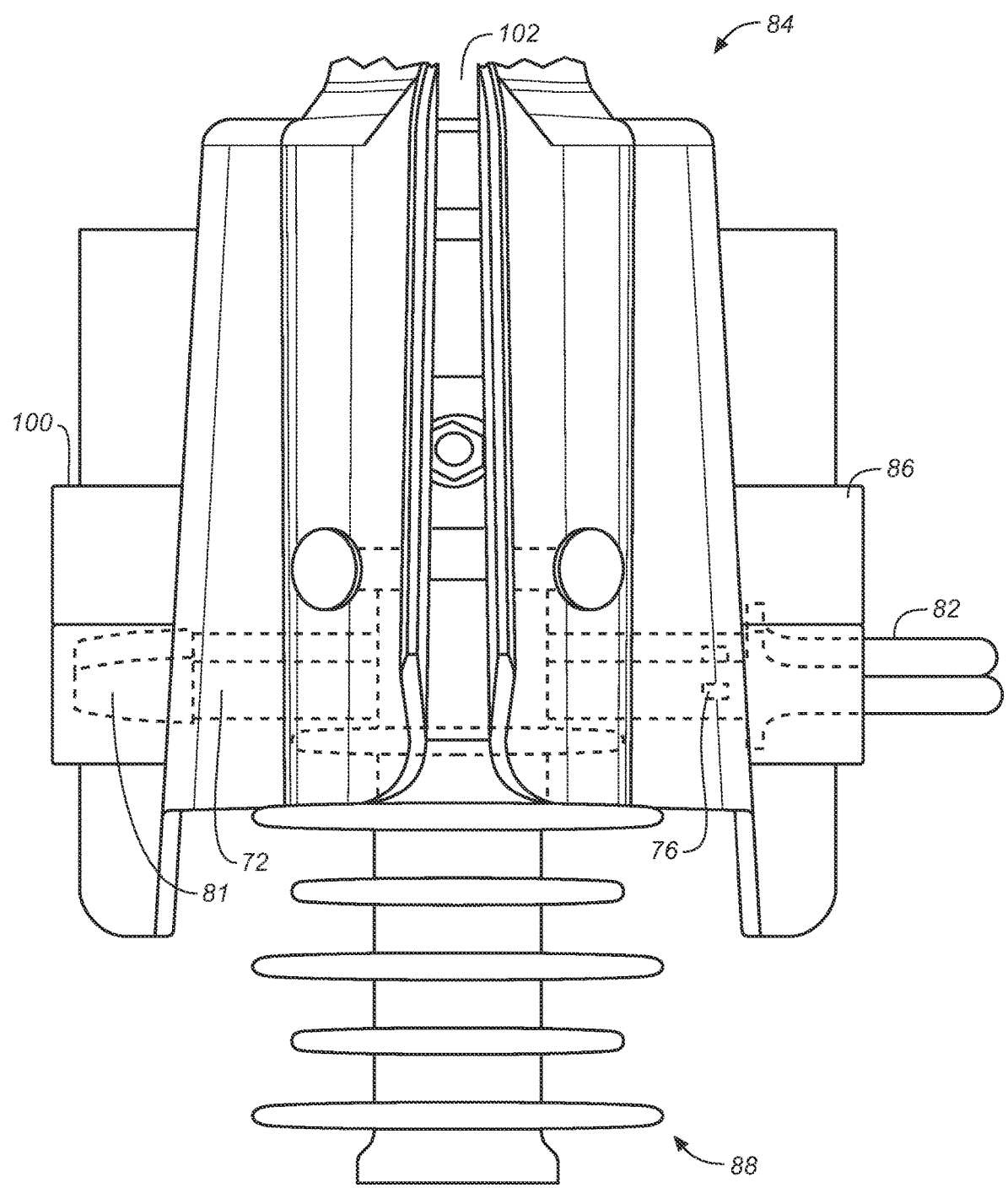
FIG. 12 is a semi-transparent view of the cover of FIG. 11, showing how the ends of the pin, except the ring portion, are surrounded by the circular fenders.

FIG. 11 is a back view of the cover 84 of FIGS. 9 and 10, and FIG. 12 is a semi-transparent view of the cover of FIG. 11. FIGS. 11 and 12 show the rear slot 102 for the wire, the fenders 86 (which allow access to the ring 82 by a hot stick), and the fenders 100 (which surround the ends 81 of the pins 72). In FIG. 12, the fenders 86 do not surround the hole in the ring 82.

To additionally prevent liquid entering the pin holes, a resilient washer may be installed between the flange of the pin and the cover.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A dielectric cover for an insulator and conductor supported by the insulator, the conductor being for carrying a voltage, the cover comprising:
   a first cover portion configured to cover at least a top portion of the insulator;
   one or more holes in the first cover portion for receiving retaining pins for securing the first cover portion over the insulator and conductor, the retaining pins having a first end with a ring configured for grasping with a hot stick, the retaining pins also having a body that extends through the one or more holes, the retaining pins also having a flange proximate the ring between the body and the ring; and
   one or more raised barriers, extending from an outer surface of the first cover portion, wherein the one or more raised barriers fully surround the one or more holes, wherein the flange of the pins fully enters the one or more raised barriers to be completely surrounded by the one or more raised barriers.

2. The cover of claim 1 wherein the one or more raised barriers at least partially cover the ring of the retaining pins.

3. The cover of claim 1 wherein the retaining pins have a second end that extends beyond the holes when inserted through the holes for securing the cover in place, and the one or more raised barriers extend beyond the second end.

4. The cover of claim 1 wherein the one or more raised barriers extend approximately one inch or greater from the surface of the cover.

5. The cover of claim 1 wherein the one or more holes include a pair of holes on opposite sides of the cover.

6. The cover of claim 1 wherein the first cover portion and the one or more raised barriers are an integral molded piece.

7. The cover of claim 1 wherein the first cover portion is an insulator cover.

8. The cover of claim 1 wherein the first cover portion is a fuse cutout cover.

9. The cover of claim 1 wherein the first cover portion covers a portion of the insulator supporting the conductor.

10. The cover of claim 1 wherein the one or more raised barriers comprise a molded piece of the first cover portion that protrudes from the surface of the first cover portion.

11. The cover of claim 1 wherein the first cover portion is installed over a high voltage component, and the retaining pins are through the one or more holes to secure the first cover portion in place.

12. The cover of claim 1 wherein the one or more holes comprise at least two holes.

13. The cover of claim 1 wherein the one or more raised barriers are circular.

14. A system for retaining a dielectric cover over a high voltage component comprising:

a retaining pin configured to extend through a hole in the cover, the pin comprising:
  a body having a first end;
  a grasping ring at a second end;
  a flange between the ring and the body, the flange configured to abut an outer surface of the cover when the pin is fully inserted through the hole; and
  a resilient portion proximate to the flange and spaced from the flange at approximately a thickness of the cover, the resilient portion being configured for compressing while the pin is being inserted through the hole in the cover and expanding when the pin is fully inserted to secure the pin in place, such that a surface of the cover is between an end of the resilient portion and the flange,
  wherein there is no resilient compressible mechanism at the first end of the body.

15. The system of claim 14 further comprising the cover over the high voltage component, where the pin extends under at least a portion of the high voltage component, after being inserted through the opposing hole, to prevent the cover being lifted off the high voltage component.

16. The system of claim 15 wherein the high voltage component comprises a conductor supported by an insulator.

17. The system of claim 16 wherein the cover is a fuse cutout cover.

* * * * *